United States Patent [19]

Wildschut

[11] Patent Number: 5,984,279
[45] Date of Patent: Nov. 16, 1999

[54] APPARATUS FOR ATTACHING A PARTITION TO AN ELONGATE SUPPORT

[75] Inventor: Gerben Wildschut, Wyckel, Netherlands

[73] Assignee: De Boer Stalinrichtingen B.V., Netherlands

[21] Appl. No.: 09/148,825

[22] Filed: Sep. 4, 1998

Related U.S. Application Data

[63] Continuation of application No. 08/762,292, Dec. 9, 1996, abandoned.

[30] Foreign Application Priority Data

Dec. 12, 1995 [NL] Netherlands ............................ 1001879

[51] Int. Cl.$^6$ ..................................................... E04H 17/14
[52] U.S. Cl. ............................. 256/65; 403/387; 403/400
[58] Field of Search ....................... 256/65, 59; 403/400, 403/387, 384

[56] References Cited

U.S. PATENT DOCUMENTS

| 2,894,773 | 7/1959 | Noe ...................................... 403/400 X |
| 3,674,243 | 7/1972 | Brown ........................................ 256/65 |
| 3,847,489 | 11/1974 | Van Riper .............................. 256/65 X |
| 4,557,467 | 12/1985 | Lin ........................................ 256/59 X |
| 4,566,819 | 1/1986 | Johnston ............................. 403/400 X |
| 4,616,950 | 10/1986 | Morris ................................... 256/65 X |
| 4,900,183 | 2/1990 | Souchko ................................... 403/40 |
| 5,143,413 | 9/1992 | Vandenhoek ........................ 403/400 X |
| 5,277,408 | 1/1994 | Parker ....................................... 256/65 |
| 5,544,866 | 8/1996 | Dye ....................................... 256/65 X |
| 5,645,271 | 7/1997 | Nunez ................................... 256/65 X |

FOREIGN PATENT DOCUMENTS

| 268310 | 5/1963 | Australia ............................... 403/400 |
| 1267408 | 5/1968 | Germany ................................. 256/65 |
| 1121079 | 7/1968 | United Kingdom ..................... 256/59 |

Primary Examiner—Katherine A. Matecki
Assistant Examiner—Emmanuel M. Marcelo
Attorney, Agent, or Firm—Mark Zovko

[57] ABSTRACT

Apparatus for coupling an elongate support and a fence, such as a partition between cubicles in a stall. Cubicle partitions are first hung from couplings which have been fixed to a horizontal member of an elongate support. The partitions are hung on the support one end at a time, allowing for a single person to perform this operation even with relatively heavy partitions. After hanging the ends of the partition, the partition can be adjusted prior to finally securing the ends of the partition to the support.

10 Claims, 3 Drawing Sheets

APPARATUS FOR ATTACHING A PARTITION TO AN ELONGATE SUPPORT

CROSS RELATION TO OTHER APPLICATIONS

This application is a continuation of U.S. Ser. No. 08/762,292, filed Dec. 9, 1996, now abandoned.

FIELD OF THE INVENTION

The invention relates to a coupling for coupling an elongate support and a fence, such as a partition between cubicles in a stall.

BACKGROUND OF THE INVENTION

Such a coupling is known, wherein this coupling forms a fixed component of the support or fence, so that coupling is effected by fastening the coupling on the support or the fence to respectively the fence or the support.

Such a coupling has the drawback, particularly with the use of a sizeable fence for coupling to the support, that two persons are required for fitting thereof, i.e. one to hold the fence in place and one to fix the coupling.

Another drawback is that such a coupling has only very limited adjustment possibilities in respect of the height and direction of the fence or the position along the elongate support at which the fence has to be fixed.

When such a coupling is used to couple a fence to a support as partition between cubicles in a stall, wherein each fence has a curved form, the outer ends of which are coupled to supports placed one above another using such couplings, a drawback is that when cubicles are desired on either side of the supports a large number of couplings is required.

SUMMARY OF THE INVENTION

The invention has for its object to remedy at least the above stated drawbacks and provides for this purpose a coupling which is distinguished by first fixing means for fixing the coupling to the support and second fixing means for fixing the fence to the coupling.

The method of assembly to be followed therefore comprises of first arranging the coupling on the support and subsequently arranging the fence on the coupling. In applications wherein the support is placed fixedly and the fence is large, assembly can nevertheless be carried out by one person.

Particularly in the use of a coupling according to the present invention to couple to a support a fence in a stall forming a partition between cubicles, the support and the fence are tubular, wherein another distinguishing feature of a coupling according to the present invention is that the first fixing means comprise a bracket and a tube hanger for fastening to the bracket. The bracket and the tube hanger can therefore be displaced in simple manner along the support in order to position the fence which is then to be coupled to the coupling.

Another feature of a coupling according to the present invention is that the fence comprises a profiled fastening part, wherein the second fixing means co-act with the profiled fastening part for fixing thereof to the tube hanger and/or the bracket. A further distinguishing feature is that the profiled fastening part comprises a flattened outer end of the fence, wherein passages are arranged herein for engagement thereof by the second fixing means. By designing the passages as slotted holes positioning of the fence relative to the coupling is possible. Indication means are preferably arranged on at least the coupling to define the relative positions of the support and/or the fence relative to the coupling. Rapid and precise assembly by one person is possible as a result.

A further distinguishing feature of a coupling according to the present invention is guide means for placing of the fence relative to the coupling. The fence is hereby held prior to assembly in a predetermined direction relative to the coupling in order to further simplify assembly.

BRIEF DESCRIPTION OF THE DRAWINGS

These and other features and advantages of the invention are further elucidated with reference to the figure description following hereinbelow of embodiments of the invention. In the drawing.

DETAILED DESCRIPTION OF THE DRAWINGS

Figure 1:
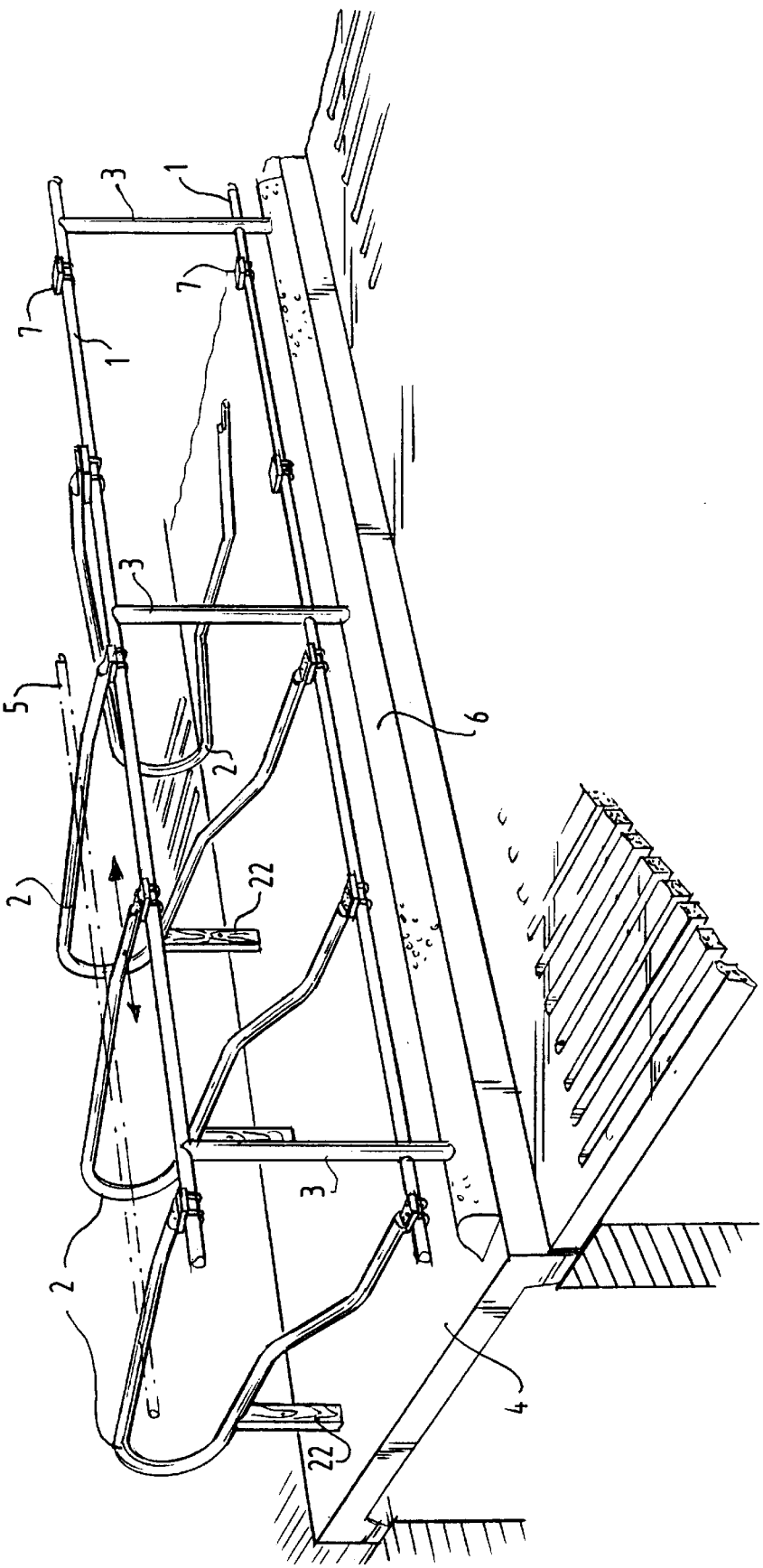
FIG. 1 shows an application of couplings according to the present invention for coupling cubicle partitions to common supports.

In the figures the same reference numerals refer to the same components. result.

FIG. 1 shows an application of couplings according to the present invention for the purpose of coupling fences designed as cubicle partitions 2 to supports designed as beams 1. Such an arrangement is usual in stalls, wherein cows for instance can go and lie in the cubicles.

The beams 1 are fixedly arranged on posts 3 which are anchored in an elevation 6 on the ground. The cubicle partitions 2, which are tubular, are not provided with separate posts so as to present injuries to the animals and corrosion of the material of such posts of cubicle partitions.

Cows walk into the cubicle and herein strike against the shoulder bar 5, whereafter they will as a matter of course go and lie on the surface 4.

The assembly method for assembling cubicle partitions 2 on beams 1 is as follows. Couplings according to the present invention, which will be further described hereinbelow, are first arranged on beams 1, whereafter the cubicle partitions are suspended on the couplings. The couplings can herein still be pushed along beams 1 and the cubicle partitions 2 can still be positioned relative to the couplings.

In the embodiment shown here the cubicle partitions 2 are first hung from couplings fixedly arranged on the upper beam 1, then supported on the distal end by means of planks 22 and hung on couplings fixedly arranged on the lower beam 1, whereafter the fastenings of the cubicle partitions 2 are secured to the associated couplings.

Figure 2:
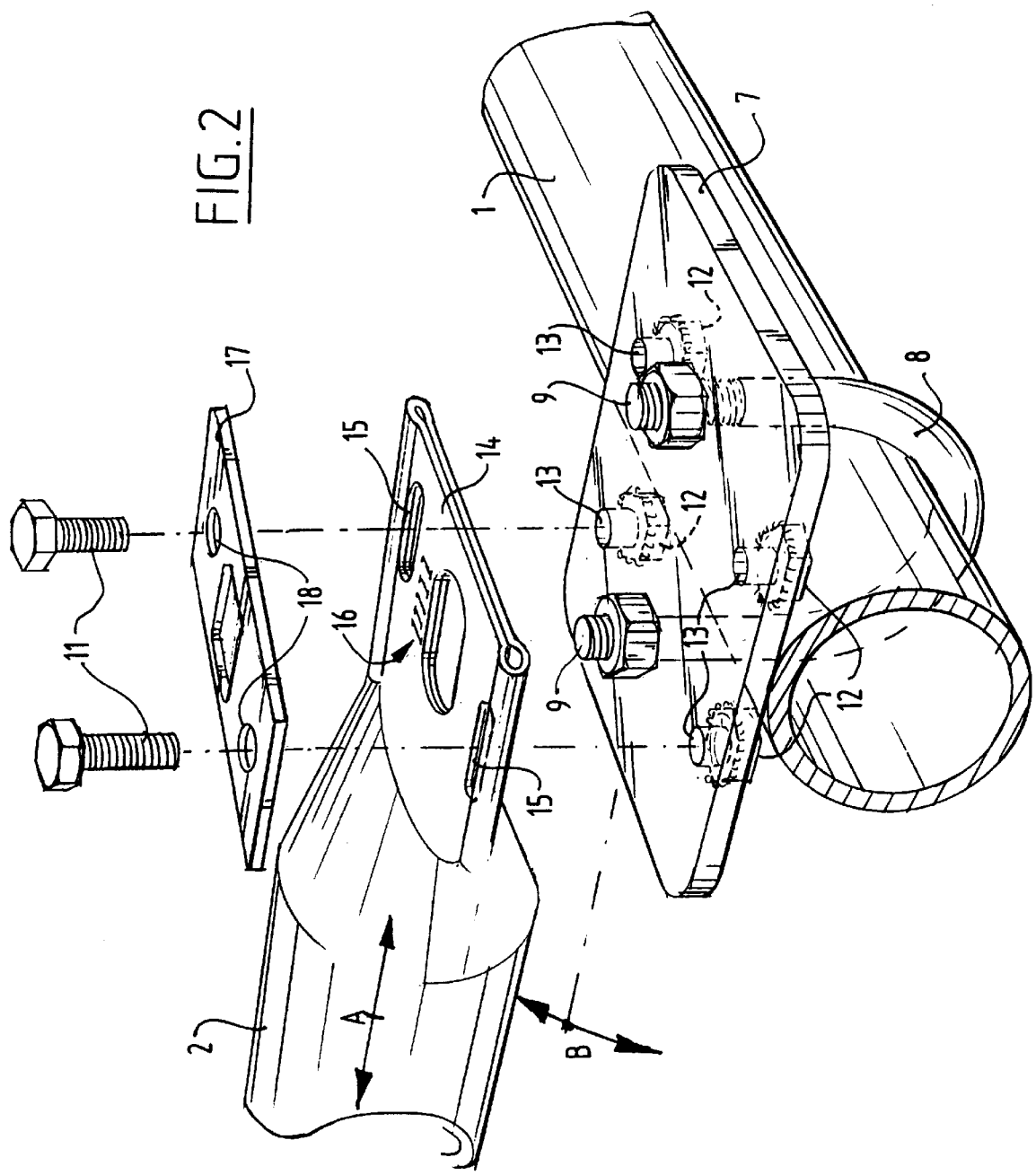
FIG. 2 shows an exploded perspective view of a first embodiment of a coupling according to the present invention.

Shown in FIG. 2 is an exploded perspective view of a coupling used in the application depicted in FIG. 1. The coupling comprises a bracket 8 and a tube hanger 7, wherein the ends of bracket 8 are placed through tube hanger 7 to enclose the beam 1 between bracket 8 and tube hanger 7. The ends of the bracket 8 are provided with a threaded end 9 over which nuts 10 can be tightened to clamp the beam 1 with force between the tube hanger 7 and bracket 8.

The tubular cubicle partition 2 has a flattened end 14 in which slotted holes 15 are arranged. When bracket 8 and tube hanger 7 are fixedly secured to the beam 1 or are still arranged sidably around beam 1, the flattened outer end 14 of cubicle partition 2 is placed on the upper surface of tube hanger 7 with a cover plate 17 thereon in which holes 18 are arranged, whereafter bolts 11 are placed through the holes 18, slotted holes 15 and the holes 13 in tube hanger 7 so as to engage round nuts 12 which are fixedly welded to the underside of tube hanger 7. The bolts 11 can then be tightened in clamping-fit manner, whereafter positioning of cubicle partition 2 is still possible in the direction of arrow A. Markings 16 are arranged on the flattened outer end 14 of cubicle partition 2 as indication means for defining the relative position of cubicle partition 2 and beam 1. When the desired positioning has been effected, the bolts 11 are tightened to fix the cubicle partition 2 to tube hanger 7, wherein cover plate 17 prevents subsequent shifting of cubicle partition 2 relative to tube hanger 7. The cover plate 17 therefore functions as arresting means.

Subsequent or prior to fixing of the bolts 11 the nuts 10 are tightened around the threaded end 9 on the extremities of bracket 8 in order to fix bracket 8 and tube hanger 7 to the beam 1 after effecting of the desired relative positioning, this being designated with arrow B.

Figure 3:
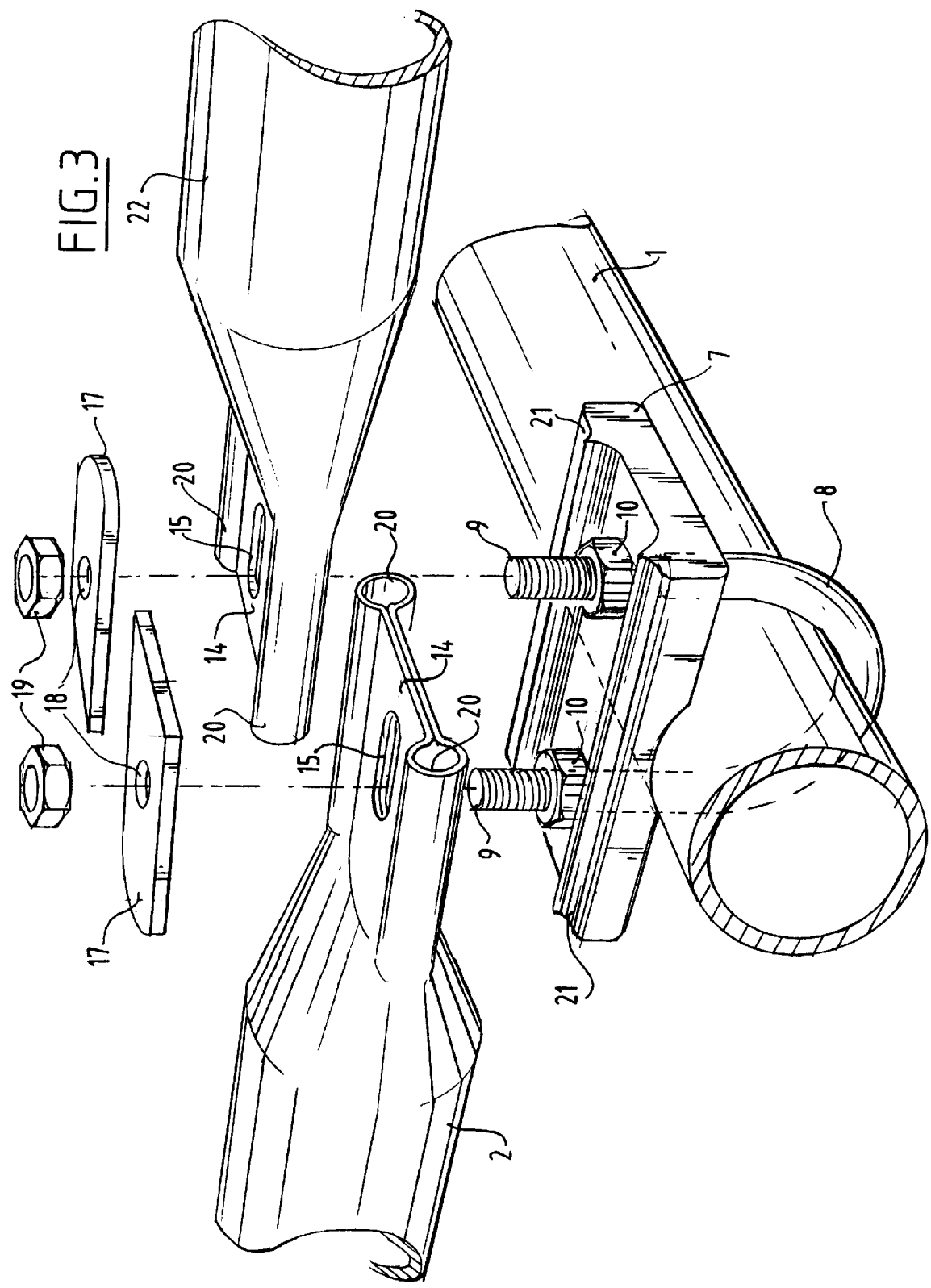
FIG. 3 shows an exploded perspective view of a second embodiment of a coupling according to the present invention.

In FIG. 3 is shown an exploded perspective view of another embodiment of a coupling according to the present invention. Both outer ends of bracket 8 are herein provided with longer threaded end 9. The tube hanger 7 is further provided with ridges 21 as guide means for placing the cubicle partition 2 relative to the coupling. Spherical portions 20 on the sides of the flattened outer end 14 of cubicle partition 2 herein fall into these ridges 21 and a threaded end 9 protrudes through a single slotted hole 15 in the flattened outer end 14 of cubicle partition 2 so that only movement of the cubicle partition 2 in lateral direction of beam 1 over ridges 21 is possible. A cover plate 17 is again arranged on the flattened outer end 14, wherein threaded end 9 protrudes through a single hole 18 in cover plate 17. The flattened outer end 14 and cover plate 17 are then placed on tube hanger 7 only when the nuts 10 have been tightened securely such that bracket 8 and tube hanger 7 are fixed to the beam 1. After placing of the flattened outer end 14 of cubicle partition 2 and the cover plate 17 over the threaded end 9 a nut 19 is screwed thereover to secure the cubicle partition 2 fixedly to the threaded end 9.

The underside of the flattened outer end 14 of cubicle partition 2 herein fits closely onto the nut 10, whereby after fastening of the nut 19, which functions as the second fixing means, the nut 10, which functions as first fixing means, is locked.

In the same manner as described above a second cubicle partition 22 can be arranged on the side of the beam 1 located opposite the first cubicle partition 2 on the other side of tube hanger 17 and over the other outer end of bracket 8 with threaded end 9. Two outer ends of cubical partitions 2, 22 can therefore be fixed to a single coupling in order to form cubicles on either side of the beam 1.

What is claimed is:

1. Apparatus for attaching a fence to a support comprising:
   a) an elongate support;
   b) at least two first couplings arranged on said support;
   c) a fence extending from said support, said fence having ends at different heights relative to said support, said fence having a fastening part on each end wherein said fastening parts coact with said first couplings for fastening each end of said fence to said first couplings;
   d) second couplings for securing each end of said fence to said first couplings, said second couplings including first fixing means for fixing said fastening parts of said fence to said first couplings; and
   e) suspension means on said first couplings for allowing suspension of said fence on said first couplings prior to securing the ends of said fence to said first couplings, said suspension means coacting with said fastening part on each end of said fence for fastening each end of said fence to said first couplings.

2. The apparatus of claim 1 wherein said support is tubular and said first couplings include a bracket and a tube hanger for fastening to said bracket.

3. The apparatus of claim 1 wherein said fastening parts of said fence have a flattened portion with passages therein, said passages adapted to receive said first fixing means for fixing said fastening parts of said fence to said first couplings.

4. The apparatus of claim 3 wherein said passages of said flattened portion of said fastening parts of said fence are slotted holes for positioning of said fence relative to said first couplings.

5. The apparatus of claim 3 which include guide means for placing of the ends of said fence relative to said first couplings.

6. The apparatus of claim 1 wherein said first fixing means includes arresting means for placing on said fastening parts of said fence to prevent shifting of said fence relative to said first couplings.

7. The apparatus of claim 6 wherein indication means are arranged on said flattened portion of said fastening parts of said fence whereby the relative position of said fence and said first couplings is designated.

8. The apparatus of claim 1 which includes second fixing means for fixing said first couplings to said support, said first fixing means securing said second fixing means.

9. The apparatus of claim 1 wherein said fastening parts of said fence and said first fixing means are adapted to attach the ends of two separate fences to each first coupling.

10. The apparatus of claim 1 wherein said suspension means includes a bracket for allowing suspension of said fence on said first couplings prior to securing the ends of said fence to said couplings.

* * * * *